Oct. 21, 1969 R. W. GUERTIN ET AL 3,473,569
COUPLER
Filed March 29, 1966 3 Sheets-Sheet 1

INVENTORS.
ROBERT L. MURRAY
BY ROBERT W. GUERTIN
*Kinney & Schenk*
ATTORNEYS.

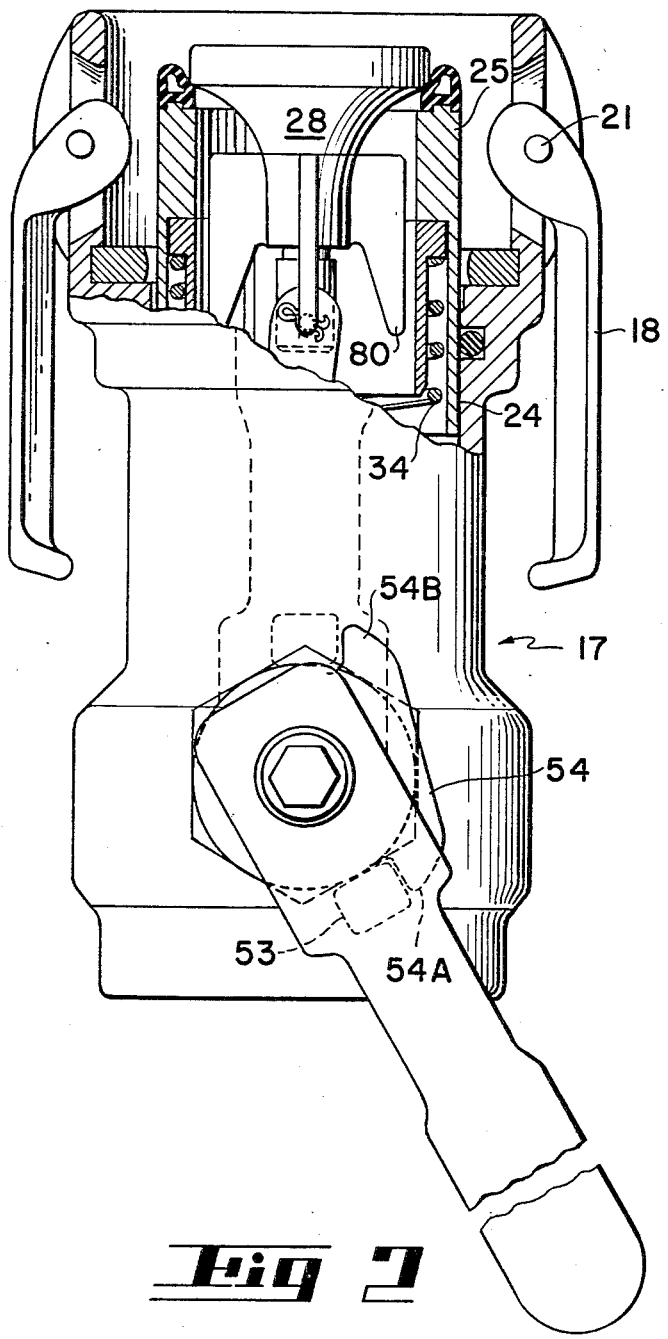

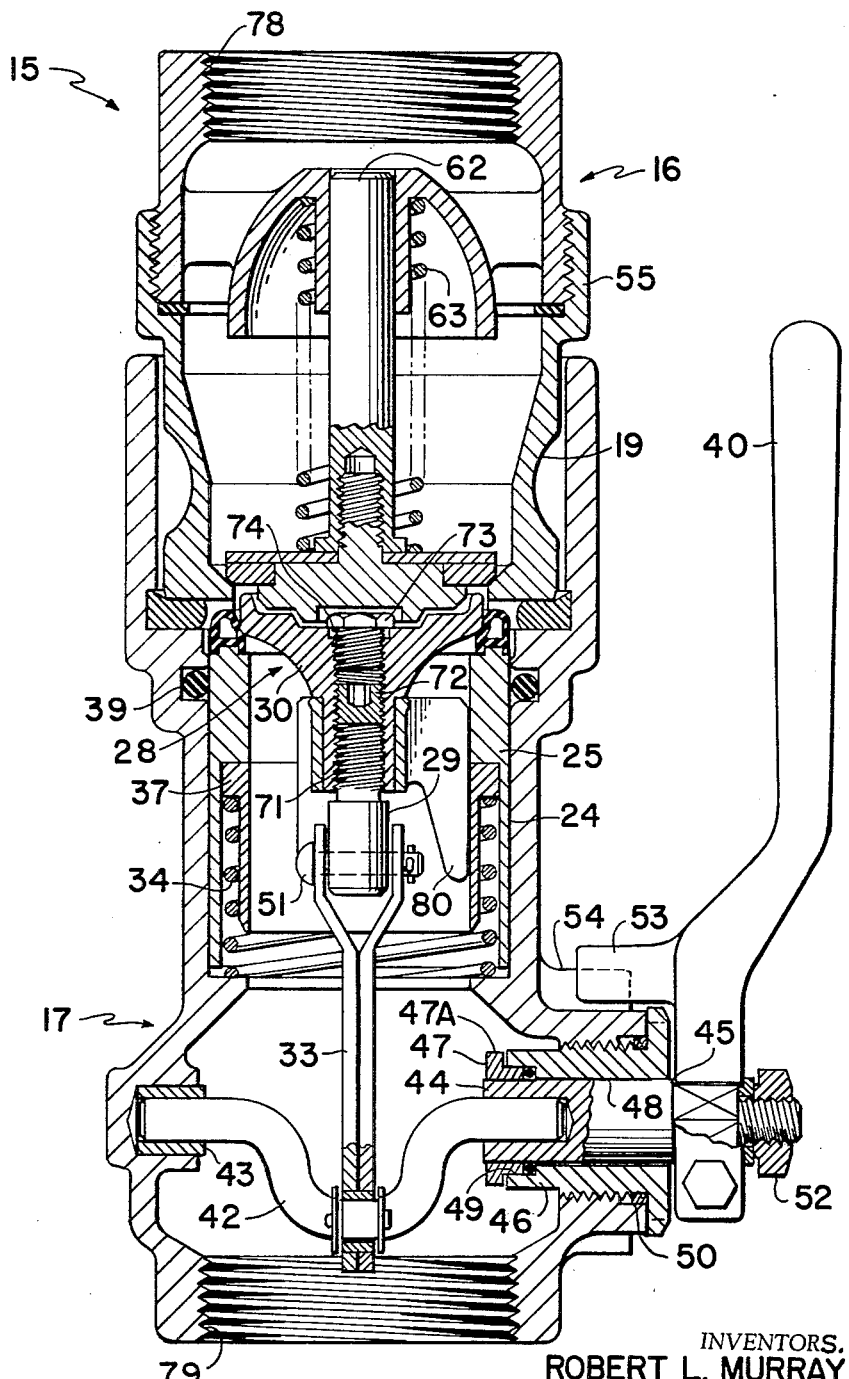

United States Patent Office 3,473,569
Patented Oct. 21, 1969

3,473,569
COUPLER
Robert W. Guertin, Cincinnati, Ohio, and Robert L. Murray, Dayton, Ky., assignors to Dover Corporation, Cincinnati, Ohio, a corporation of Delaware
Filed Mar. 29, 1966, Ser. No. 538,411
Int. Cl. F16l 37/28, 19/00
U.S. Cl. 137—614.06                                7 Claims

ABSTRACT OF THE DISCLOSURE

A coupling device including valve means that are actuated after the cooperating members are fastened together.

---

This invention pertains to coupling devices and more particularly to a valved coupling device for use in a fluid system.

A problem with fluid coupling devices in current use is that such devices lose a quantity of fluid during uncoupling. Where such coupling devices are used in fluid systems containing fluids which are of a dangerous nature such loss of fluid is particularly undesirable. A further problem with the cooperating coupling members of many current coupling devices is that it is possible with little effort to actuate such members while they are uncoupled and thereby lose fluid therefrom. In addition, some of such devices require a number of complicated interlocks to guard against inadvertent opening and to assure that fluid will flow therethrough when the cooperating members of such couplers are fastened together in fluid flow relation. Such interlocks are expensive to produce and require complex operating procedures.

Therefore, one feature of this invention is to provide a valved coupling device for fluid conduit means which is of simple and economical construction and which eliminates the complex mechanical structure present in the interlocks employed in currently used devices.

Another feature of this invention is to provide a valved coupling device in which the coopertaing coupling members thereof can be easily and simply fastened together without requiring any special angular orientation of such members.

Another feature of this invention is to provide a valved coupling device comprised of a pair of cooperating members adapted to be coupled together in which one of said members includes actuating means for opening passage means through such coupling device once the cooperating members are fastened together, and also include means in such one member assuring fluid cannot be lost therefrom in the event of inadvertent actuation of such actuating means to an open position with the members uncoupled, and further assuring such members cannot be coupled until such actuating means is moved to a closed position.

Another feature of this invention is to provide a valved coupling device comprised of an adapter and a cooperating coupler in which the coupler has a floating cylindrical sleeve carried for axial movement along the axis of such coupler, such sleeve assuring that an adequate seal is provided for such coupler so that pressurized fluid contained therewithin cannot escape and allowing flow therethrough only when such adapter and coupler are coupled together in fluid flow relation.

Another feature of this invention is to provide a valved coupling device which if inadvertently unfastened while fluid flow is continuing therethrough in which a pair of cooperating coupling members comprising such device each has valve means therewithin which seals instantaneously to reduce fluid loss to a minimum.

Another feature of this invention is to provide a valved coupling device having integral valve means and adjusting means for such valve means enabling economical precision assembly and providing compensation for wear and manufacturing discrepancies.

Therefore, it is an object of this invention to provide a valved coupling device for fluid conduit means having one or more of the novel features of this invention as set forth above or hereinafter shown or described.

Other objects, uses, and advantages of this invention are apparent from a reading of this description, which proceeds with reference to the accompanying drawings forming a part thereof and wherein:

FIGURE 2 is a view of the coupler portion of the coupling device of this invention with a portion of such coupler shown in section and particularly illustrating a telescoping cylindrical sleeve carried within such coupler in its extended position and an actuating handle for the actuting means provided for such coupling device.

FIGURE 3 is a sectional view of the valved coupling device of this invention with the adapter and coupler portion thereof coupled together and prior to actuating the actuating handle to thereby place such coupling in the open position for fluid flow therethrough as illustrated in FIGURE 1.

Figure 1:
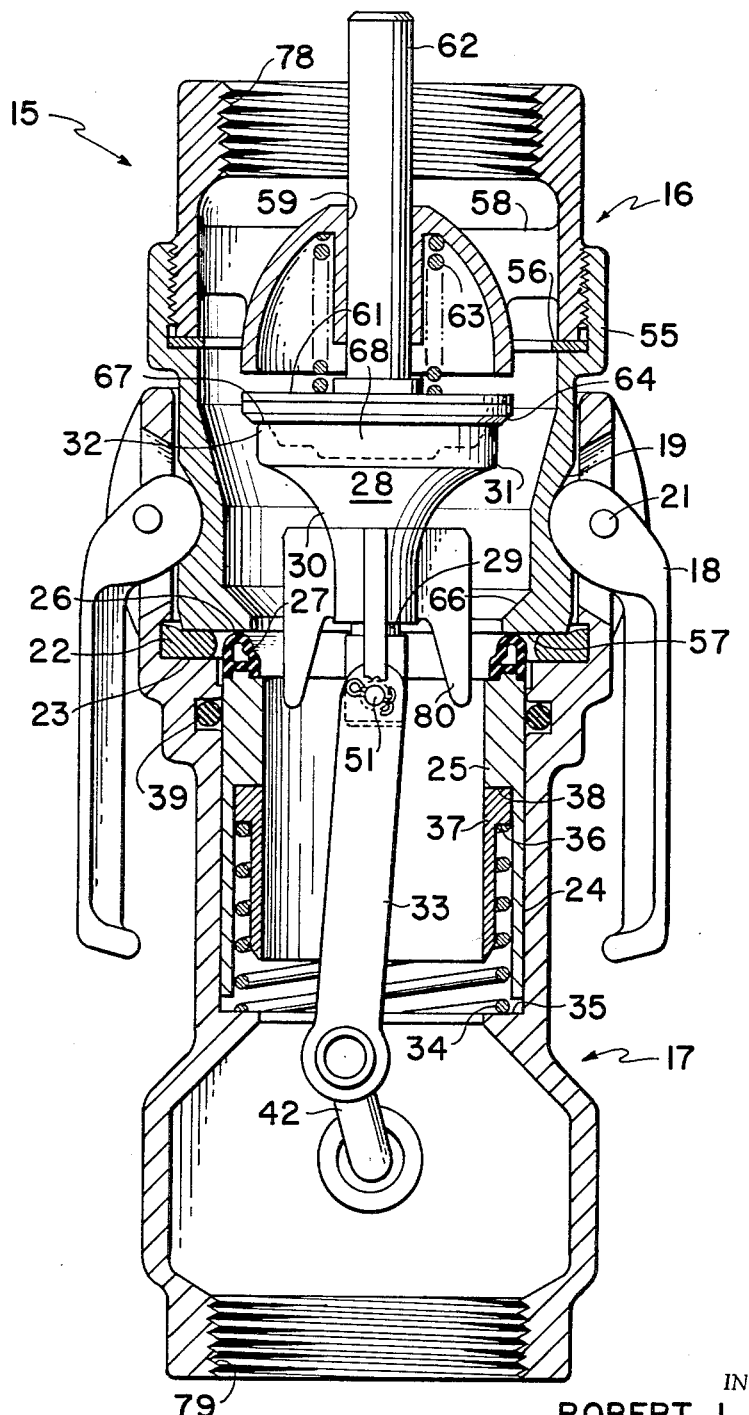
FIGURE 1 is a sectional view of the coupling device of this invention showing the fastening means for fastening and unfastening the cooperating members defining such coupling device and showing such device in the open position for fluid flow therethrough.

While the various features of this invention are hereinafter illustrated and described as being particularly adaptable to fluid systems handling dangerous and flammable fluids, it is to be understood that various features of this invention can be utilized singly or in any combination thereof to provide coupling devices for use with any fluid whether in a liquid or gaseous state.

Therefore, this invention is not to be limited to only the embodiments illustrated in the drawings, because the drawings are merely utilized to illustrate one of the wide variety of uses of this invention.

In the exemplary embodiment of this invention illustrated in the drawings, an improved coupling device or coupling 15 is illustrated. Coupling 15 comprises a pair of cooperating cylindrical members fastened together about a common axis by fastening means provided on such members. The cooperating members are readily fastened together irrespective of their angular positions about such axis and each includes valve means for sealing fluid therewithin upon unfastening thereof to provide a dry-break, i.e. the cooperating pair of members are taken apart essentially without spilling or losing fluid in any way. Actuating means is provided in one of such pair of cooperating members for opening and closing valve means provided within the coupling to control fluid flow through such coupling. Means is provided in valve means of such one member for keeping fluid sealed therewithin while the cooperating members are unfastened, even with inadvertent actuation of the actuating means to the open position. Furthermore, with such actuating means in the open position while the cooperating members are unfastened, a physical interference is produced preventing such members from being coupled together until the actuating means is moved to its closed position. The valved coupling device of this invention is simple to operate, inexpensive to produce, and uses a minimum of component parts, in addition it is capable of being operated essentially in a foolproof manner, whereby spillage is kept at an absolute minimum.

As illustrated in FIGURE 1 of the drawings, coupling device 15 comprises a male member or adapter 16 and a female member or coupler 17. Both adapter 16 and coupler 17 are generally right circular cylindrical in shape and the terminal end portion of adapter 16 is received in a cooperating receiving bore in an associated end portion of coupler 17.

Fastening means is provided for fastening and unfastening the adapter and coupler about a common axis and irrespective of their angular orientation about such axis. The fastening means comprises a pair of handles each designated by the numeral 18 and fastened to coupler 17 on opposite sides thereof and a cooperating annular groove 19 in adapter 16.

A pair of pivot pins 21, each designated by the numeral 21, are suitably fixed to opposite sides of coupler 17. Each pin projects from coupler 17 and extends through a cooperating opening in an associated handle 18. Each handle 18 pivots about its associated pin 21 and is held in position on such pin by any suitable means such as peening.

Each handle 18 has a contour adjacent its associated pin such that with the handle extending downwardly, as shown in FIGURE 1, a portion thereof projects beyond the inner circumferential surface of coupler 17 and is received within groove 19 to thereby fasten coupler 17 and adapter 16 together to form the coupling device 15. With handles 18 extending upwardly, the previously projecting contour is rotated away from adapter 16 and its groove 19 so that such adapter may be withdrawn therefrom within coupler 17.

Thus, it is seen that coupling 15 is uncoupled or unfastened by lifting its handles 18 toward adapter 16 to enable separation of such adapter and coupler. Coupling 15 is coupled or fastened by inserting adapter 16 within the receiving bore of coupler 17 so that the terminal end portion of adapter 16 engages seal means such as gasket 22 supported on a shoulder 23 of coupler 17 and then lowering handles 18 against the body of coupler 17.

With adapter 16 fastened in position with its terminal end portion engaging gasket 22 a fluid seal is provided assuring that fluid carried within coupling 15 and its associated conduit system does not leak out. As will be apparent from the drawings, seal 22 acts in effect as a double or backup seal while fluid is flowing through coupling 15.

Actuating means is provided for controlling fluid flow through coupling device 15. The actuating means in this example of the invention is carried by coupler 17 and the detailed description of such actuating means will be given subsequently.

Unique valve means is provided within coupler 17. With coupling device 15 in its coupled position the actuating means carried by coupler 17 opens such valve means to allow fluid to flow through the coupling device. With coupling 15 uncoupled the valve means in coupler 17 assures that even with such actuating means in the open position fluid contained within coupler 17 does not leak out.

Coupler 17 has right circular cylindrical bore means or a cylindrical bore therein designated by the numeral 24 and cooperating generally cylindrical sleeve 25 carried within bore 24 for telescoping movements. Lip seal means is provided on the outer terminal edge of sleeve 25 and includes a terminal sealing surface 26 corresponding generally to the circumferential outline of sleeve 25 as well as a sealing portion 27 spaced inwardly from the outer periphery of sleeve 25.

Poppet means illustrated as a poppet 28 is provided for cooperation with sleeve 25. Poppet 28 has a stem 29 arranged generally coaxially within sleeve 25 and a generally circular disk-like head portion 30. Head 30 has an inner peripheral portion 31 which cooperates with the sealing portion 27 of sleeve 25 to provide a fluid seal. Poppet 28 is supported within coupler 17 for axial movement generally along the axis of sleeve 25. The axial movement of poppet 28 is controlled by connecting means illustrated as a connecting link 33 fastened at one end to stem 29 and at its opposite end to the actuating means.

Bias means is provided for urging sleeve 25 outwardly so that its sealing portion 27 engages peripheral portion 31 of poppet head 30, as illustrated in FIGURE 2, and thus provide a seal therebetween for all axial positions of poppet 28 with the adapter 16 and coupler 17 unfastened. In this example of the invention such means for urging comprises a compression spring 34. Spring 34 engages a shoulder 35 on coupler 17 at one end and an outer edge 36 of an annular transition ring 37 at its opposite end. The inner edge of transition ring 36 engages a cooperating shoulder 38 provided on sleeve 25. In effect ring 37 extends the cylindrical bore of sleeve 25 within coupler 17 while shielding a portion of the spring 34 to provide better support therefor and help prevent turbulence in the fluid flow. An O-ring type seal 39 is also provided between coupler 17 and sleeve 25 to assure that fluid leakage does not occur between such members. Thus it is seen, as illustrated clearly in FIGURE 2, that with coupler 17 unfastened from its cooperating adapter 16 telescoping sleeve 25 is urged by spring 34 to follow poppet 28 and maintain a fluid seal throughout the entire range of travel of such poppet.

Actuating means is provided (see FIGURES 2 and 3) for opening and closing valve means in coupling 15 with adapter 16 and coupler 17 coupled together to thereby control fluid flow through such coupling. The actuating means comprise rotatable crankshaft means or crankshaft 42 carried within coupler 17 and rotatably supported in a bearing shown as sleeve bearing 43 at one of its ends and having a stem 44 fixed to its opposite end. Stem 44 extends through the generally cylindrical wall of coupler 17 and has a shoulder 45 thereon near its outer end. Bushing means 46 is provided for supporting stem 44.

Bushing 46 is threaded into coupler 17 and has a cooperating bore 48 for receiving and supporting the stem 44 along a substantial portion of its lentgh. A stem retainer 47 is fixed to the inner end of stem 44 and has a shoulder 47a which cooperates with the inner end of bushing 46 to limit outward axial movement of stem 44. Crankshaft 42 is provided with radial support by bearing 43 and the bore 48 of bushing 46. Axial support is provided for crankshaft 42 between bushing 43 and stem 44. Bushing 46 has a cooperating counter bore 49 to receive an O-ring seal on stem 44. As seen in FIGURE 3 the seal is supported between the stem 44, stem retainer 47 and bushing 46. An additional suitable seal 50 is provided between bushing 46 and coupler 17 to assure that fluid does not seep or leak out of such coupler.

Connecting means is provided for connecting crankshaft 42 to poppet 28. Such connecting means comprises connecting link 33 previously mentioned and having a bifurcate end for receiving stem 29 of poppet 28 therein. A pin 51 passes through suitably arranged holes in the end of stem 29 and the bifurcate end of link 33. Pin 51 is held in position by a cotter pin or the like. The opposite end of link 33 is provided with a bearing and is suitably fastened to crankshaft 42, such that upon rotation of crankshaft 42 connecting link 33 will provide the desired reciprocating motion of poppet 28.

An actuating handle or arm 40 is provided for crankshaft 42 and in this example arm 40 is actuated manually. Arm 40 is attached to crankshaft 42 in any suitable manner, for example, by serrating the terminal outer end of stem 44 and providing cooperating female serrations in arm 40 about an associated receiving bore therein and then holding such arm in position by a nut 52 or the like as illustrated in FIGURE 3.

Handle 40 has a projection 53 adjacent its serrated end and projecting toward coupler 17. Upon rotating handle 40 projections 53 engages a stop 54 (see FIGURE 2) having a pair of spaced apart surfaces 54A and 54B corresponding respectively to the outer and inner position of the actuating motion. The handle 40 in FIGURE 2 is shown rotated to the position considered the open position when adapter 16 and coupler 17 are fastened together. To move handle 40 to its closed position it is rotated clockwise until projection 53 strikes surface 54B. This rotating movement is closely correlated with the desired movement of poppet 28 and the telescoping movement of cylindrical sleeve 25.

It will now be apparent from FIGURE 2 that if inadvertently the actuating lever 40 were to be actuated to the open position with coupler 17 uncoupled, sleeve 25 would merely follow the poppet 28 and maintain a fluid seal throughout the entire range of movement of poppet 28.

It will be seen also in FIGURE 2 that with actuator arm 40 moved to the open position illustrated, that poppet 28 and sleeve 25 are extended outwardly past their normal position of FIGURE 3 and thus it would be impossible to couple the members together until such time as actuating arm 40 is moved to the closed position. Thus two features are readily illustrated, namely that inadvertent actuation of lever 40 with the coupling uncoupled does not result in loss of fluid from coupler 17 and that it is physically impossible to fasten adapter 16 and coupler 17 together until the actuating arm 40 is moved to its closed position.

Adapter 16 has a cylindrical sleeve 55 threaded thereon defining that portion of adapter 16 which is received within coupler 17. A seal 56 is provided at the threaded connection to prevent leakage of fluid out of the adapter. Sleeve 55 has a terminal outer sealing edge which engages seal 22 carried in coupler 17 and stop means illustrated at 57. It will be seen from FIGURE 1 that once coupler 17 and adapter 16 are fastened together, and the actuating means is opened to the valve open position illustrated, the terminal sealing surface 26 provided on cylindrical sleeve 25 engages shoulder 57 and provides a fluid tight seal.

Adapter 16 has a bridge therein indicated by the numeral 58 and such frame has a bore 59 therein arranged coaxially with the axis of adapter 16. A second poppet or an adapter poppet indicated by the numeral 61 and having a stem 62 is provided for movement within adapter 16. Stem 62 is axially slidable back and forth in bore 59 and poppet 61 is spring urged outwardly to a normally closed position by a spring 63 cooperating between spider 58 and the disk-like head of poppet 61.

Annular gasket means illustrated as a gasket 64 is fixed on the outer sealing face of the head portion of poppet 61. With device 15 uncoupled spring 63 urges poppet 61 so that gasket 64 is urged into sealing engagement with a chamfer 66 provided in the terminal inner end portion of the sleeve portion 55 of adapter 16. It will be appreciated that the angle of chamfer 64 not only assures a good seal to prevent fluid from leaking out of adapter 16 but it also assures that with wear of gasket 64 a good seal is maintained at a different area on chamfer 66.

Gasket 64 has a portion spaced inwardly from chamfer 66 and illustrated by the numeral 67. The portion 67 is engaged by the terminal outer edge 32 of poppet head 30 such that upon first coupling adapter 16 and coupler 17 as shown in FIGURE 3 and then actuating actuating handle 40 to the position shown in FIGURE 1, terminal end 32 engages gasket 64 at 67 to unseat the normally closed adapter poppet 61.

The opening sequence of coupling 15 is such that upon actuating arm 40 to the open position the terminal end 32 of poppet head 30 engages gasket 64 at 67 first, immediately prior to unseating gasket 64 from chamfer 66 and sealing edge 31 of poppet 28 from its associated sealing portion 27 of cylindrical sleeve 25. This sequence although practically instantaneous assures that fluid is not trapped or will seep between poppet 61 and head 30 in the space illustrated at 68 to assure that upon subsequently actuating the actuating means to the closed position and unfastening coupling device 15 a dry break is provided.

Adjusting means is provided for adjusting the relative position of the poppet 28 with respect to coupler 17. This adjusting means assures that coupling 15 can be assembled while utilizing components having practical manufacturing tolerances consistent with economy as well as inherently providing for adjustment in the event of wear of components causing poor sealing between the poppet head 30 and sealing portion 27.

As will be apparent from FIGURE 3, the poppet stem 29 is threaded into poppet head 30 as illustrated at 71. A set screw 72 is provided and is threaded from the outer end of head 30 into engagement with the threaded portion of stem 29. Set screw 72 when threaded into position acts as a lock against further movement or rotation of poppet head 30. A plug 73 is threaded into the terminal outer end of poppet head 30 and such plug has a seal 74 so that fluid cannot leak through the threaded portion. To adjust the effective position of the poppet 28 it is merely necessary to remove plug 73, loosen set screw 72, and then achieve the desired threading in or out of the poppet head 30. The set screw 72 is then threaded into engagement with the stem portion 29 of poppet 28 followed by threading plug 73 and its seal 74 in position. It will be apparent from the linkage provided that poppet 28 can swivel at the yoke portion of connecting link 33 about pin 51 and thereby is in effect self-aligning to provide a proper seal at all times and even with possible uneven wear of the cooperating sealing portions.

Having thus described the operating components of coupling 15 the operation thereof will be readily apparent from viewing the drawings. With arm 40 actuated to its normally closed position the adapter 16 and coupler 17 are fastened together by fastening arms 18 generally as previously described. Arm 40 is then rotated to allow fluid to flow through coupling 15. As arm 40 is rotated the terminal outer edge or projection 32 on poppet 28 engages the gasket 64 of poppet 61 at 67. Practically simultaneously thereafter the terminal end portion 26 of the lip seal on sleeve 25 engages the terminal end portion of adapter 16 at 57. This sequence assures fluid is not trapped between poppets 28 and 61 at 68, as previously mentioned, as well as further assuring that fluid does not leak out of coupling 15 past seal 22. Continuing to move arm 40 so that it is in its fully actuated position causes poppet 61 to be completely unseated from its chamfer seat 66 while poppet 28 moves completely away from its sealing portion 27. Thus, a complete fluid path is provided through coupling 15 as illustrated in FIGURE 1. Note that in this position poppet 61 is held with its spring 63 in its compressed position and sleeve 25 is held with its spring 34 in its compressed position. If, inadvertently, arms 18 were to be moved to unfasten coupling 15, practically instantaneously, poppet 61 would be urged to seal within its adapter 16 while sleeve 25 would be urged to telescope against poppet 28 and provide a fluid seal—note that under this hypothetical condition actuating arm 40 is still in the open position. Thus a dry break is essentially provided even under these adverse conditions. As will be apparent from the foregoing description, and during normal operation, the actuating means in effect overrides valve means in both the adapter 16 and coupler 17 to provide flow through coupling 15.

Means is provided in both adapter 16 and coupler 17 for connection within a fluid system. While various types of connection means could be used, in this example threaded holes 78 and 79 are provided in adapter 16 and coupler 17 respectively.

As previously mentioned poppet 28 is supported for axial movement generally along the axis of sleeve 25. The stem 29 of poppet 28 is of course fastened to and supported by link 33. In addition, a spider at 80 in FIGURE 3 is also provided to support poppet 28 along its movement.

Various seals, gaskets, O-rings and the like have been described throughout this disclosure. Obviously the detailed material composition of each of such seals must be compatible with the type of fluid being handled and must have adequate sealing qualities over extended use.

Thus, it is seen that a simple economically constructed valved coupling device has been provided in which the cooperating members thereof which are coupled together can be coupled about a common axis irrespective of their individual angular position about such axis and such coupling device includes means in each of such members which provides a fluid seal for fluid contained therewithin even with inadvertent unfastening of the fastening means for the coupling device, and in which one of said members has actuating means for such coupling and valve means therewithin which operate such that even with such actuating means inadvertently opened while such cooperating members are unfastened such valve means prevents fluid leakage from such one member and physically obstructs coupling of such members until the actuating means is returned to a closed position.

While the form of the invention now preferred has been disclosed as required by statute, other forms may be used, all coming within the scope of the claimed subject matter which follows.

What is claimed is:

1. A valved coupling device for use in a fluid system comprising a first member, a second member cooperating with said first member to provide a coupling device, each of said members having means for connection to a fluid system, movable means mounted on one of said members to cooperate with the other of said members to fasten said members to each other, said one member having sealing means thereon, said movable means urging a terminal outer edge of said other member into engagement with said sealing means on said one member, cylindrical bore means in said one member, cylindrical sleeve means supported for telescoping movement within said cylindrical bore means, first poppet means arranged coaxially with said cylindrical sleeve means and supported on said one member for controlled axial movement, said first poppet means having a maximum diameter greater than the inner diameter of said sleeve means, said sleeve means having sealing means on one end thereof for engagement by said first poppet means to provide a fluid seal for fluid within said one member, actuating means carried by said one member and operatively connected to said first poppet means to control fluid flow through said coupling with said members coupled together by said movable means, said actuating means moving only said poppet means without any movement of either of said members, and means urging said first poppet means and said sealing means of said sleeve means together to provide a seal therebetween for any position of said actuating means while said members are unfastened, said first poppet means and said sleeve means further providing a physical interference hindering said members from being coupled in the event said actuating means is inadvertently actuated open with said members unfastened.

2. The valved coupling device according to claim 1 in which said first poppet means includes a head, a stem, first means connecting one end of said stem to said actuating means, and second means connecting the other end of said stem to said head, one of said connecting means including means to adjustably position said head and sealing means of said sleeve means with respect to said actuating means.

3. The valved coupling device according to claim 2 in which said head of said first poppet means has an axial threaded open ended bore extending therethrough, said stem being threaded into one end of said bore, said adjustable positioning means including a set screw threaded into the other end of said bore and contacting an end of said stem to limit movement of said stem into said bore to adjustably position said head with respect to said sealing means of said sleeve means, and means to seal said bore against fluid leakage therethrough.

4. The valved coupling device according to claim 1 in which said actuating means includes rotatable crankshaft means disposed within said one member, said one member having a bearing supported therein, one end of said rotatable crankshaft means being supported in said bearing, the other end of said rotatable crankshaft means having a stem fixed thereto, said stem extending through a wall of said one member, link means connecting said rotatable crankshaft means to said first poppet means, said link means being pivotally connected to said rotatable crankshaft means and to said first poppet means, and means attached to said stem for rotating said rotatable crankshaft means to move said first poppet means within said one member.

5. The valved coupling device according to claim 1 in which said other member has second poppet means axially movable therein, said other member having a shoulder on its terminal outer edge, said second poppet means having annular gasket means on its terminal outer face, means biasing said second poppet means normally closed to cause said annular gasket means to engage said shoulder of said other member to provide a fluid seal and prevent flow of fluid through said other member, said annular gasket means having a portion spaced inwardly from said shoulder for engaging said first poppet means in said one member when said first poppet means is moved by said actuating means, said inwardly spaced portion of said annular gasket means engaging said first poppet means prior to unsealing said first poppet means and said second poppet means to insure fluid is not trapped or seeps between said first poppet means and said second poppet means.

6. The valved coupling device according to claim 1 in which said cylindrical sleeve means includes a first member having first and second portions with said first portion having a larger inner diameter than said second portion, a second member disposed within said second portion of said first member and having the same inner diameter as the inner diameter of said first portion of said first member, said second member having first and second portions with said second portion having its outer surface spaced from the inner surface of said second portion of said first member to form a space therebetween, and said urging means including a spring extending into the space between said second portion of said first member and said second portion of said second member and having one end acting against said first portion of said second member.

7. A valved coupling device for use in a fluid system comprising a first member, a second member cooperating with said first member to provide said coupling device, attaching means on each of said members for attaching each to separate parts of a fluid system, fastening means for fastening and unfastening said members about a common axis irrespective of their angular orientation about said axis, first valve means in said first member biased to a normally closed position to prevent flow of fluid therethrough, stop means on the terminal outer edge of said first member, cylindrical bore means in said second member, telescoping cylindrical sleeve means in said second member arranged to telescope within said cylindrical bore means, seal means on the outer edge of said sleeve means having a terminal sealing surface corresponding to the outline of said sleeve means, said seal means including a sealing portion spaced inwardly from the outer periphery thereof, first poppet means arranged coaxially with said sleeve means and supported for axial movements, said first poppet means having an axial threaded open ended bore extending therethrough and a stem adjustably threaded into one end thereof, and a set screw threaded into said bore from the other end and contacting the end of said stem within said bore and locking said stem against further movement in said bore toward said other end, means urging said telescoping sleeve means so said inwardly spaced sealing portion of its seal means is held in sealing relation against said first poppet means for all axial positions of said first poppet means with said members unfastened, and actuating means carried by said second member and operatively connected to said first poppet means for opening and closing said first poppet means, such that upon fastening said members together while arranged in any random manner about said axis and independently actuating said actuating means said first poppet means engages and overrides said first valve means while practically simultaneously thereafter said terminal sealing surface engages said stop means and stops the telescoping action of said sleeve means to unseat said first poppet means from said inwardly spaced sealing portion and provide a fluid passage through said coupling device, said second member being enlarged at its end remote from said first member and carrying said actuating means, said actuating means comprises a rotatable crankshaft means carried within said enlarged end of said second member and rotatably supported in a bearing at one end and having a stem fixed thereto at the opposite end, said stem extending through a wall of said second member and having shoulder means thereon, connecting means connecting said crankshaft means to said first poppet means, said connecting means comprising a link pivoted at one end to said crankshaft means and the other end to said poppet stem, and means for rotating said crankshaft means to thereby move said poppet means within said second member.

References Cited

UNITED STATES PATENTS

| | | | |
|---|---|---|---|
| 2,770,256 | 11/1956 | Krapp | 285—320 |
| 3,045,721 | 7/1962 | Shepherd | 141—346 |
| 3,168,125 | 2/1965 | Rosell | 137—614.06 |
| 3,217,747 | 11/1965 | Joanis | 137—614.06 |
| 3,301,272 | 1/1967 | Pettyjohn | 137—614.06 |

FOREIGN PATENTS 680,159    2/1964    Canada.

WILLIAM F. O'DEA, Primary Examiner

HOWARD M. COHN, Assistant Examiner

U.S. Cl. X.R.

141—346; 287—20